US006950200B1

(12) United States Patent
Yamada et al.

(10) Patent No.: US 6,950,200 B1
(45) Date of Patent: Sep. 27, 2005

(54) APPARATUS AND METHOD FOR RE-OUTPUTTING IMAGE DATA UNDER DIFFERENT CONDITIONS DEPENDING ON TIME PASSING FROM OUTPUT OF THE IMAGE DATA

(75) Inventors: Tatsutoshi Yamada, Toyokawa (JP); Yoshikazu Takesada, Sakai (JP)

(73) Assignee: Minolta Co., Ltd., Osaka (JP)

( * ) Notice: Subject to any disclaimer, the term of this patent is extended or adjusted under 35 U.S.C. 154(b) by 1059 days.

(21) Appl. No.: 09/688,343

(22) Filed: Oct. 16, 2000

(30) Foreign Application Priority Data

Oct. 18, 1999 (JP) ................................ 11-295173

(51) Int. Cl.[7] ......................... G06K 15/02; G06F 3/12; G06F 13/00

(52) U.S. Cl. .................... 358/1.13; 358/1.14; 358/1.15

(58) Field of Search ................................ 358/1.1–1.18

(56) References Cited

U.S. PATENT DOCUMENTS 5,726,770 A 3/1998 Harada ....................... 358/444

FOREIGN PATENT DOCUMENTS

JP 07221949 8/1995
JP 09284518 10/1997

*Primary Examiner*—Douglas Tran
(74) *Attorney, Agent, or Firm*—Buchanan Ingersoll PC

(57) ABSTRACT

When an image forming operation by a copying machine is completed, a memory recall key is displayed on a touch panel of an operation panel. If a user intends to output image data again, which has been stored in the copying machine and output once, the user presses the memory recall key. If the memory recall key is pressed before a predetermined time passes from the point of time when the image data to be output again is first output, that image data is directly output again. On the other hand, if the memory recall key is pressed after the predetermined time passes from the first output of the image data to be output again, that image data is output again on condition that a password number is entered.

18 Claims, 10 Drawing Sheets

F I G. 3
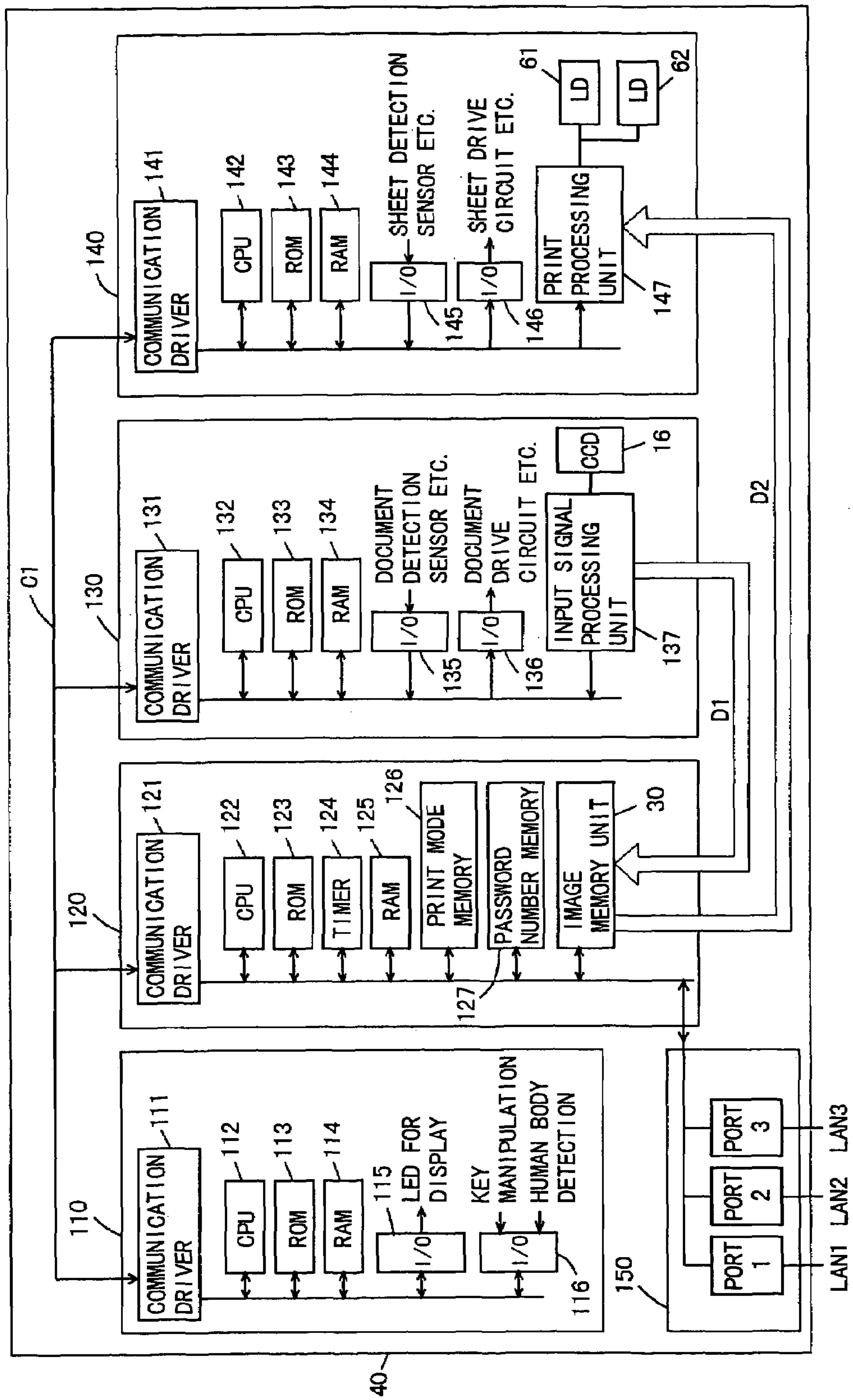

F I G. 1 0
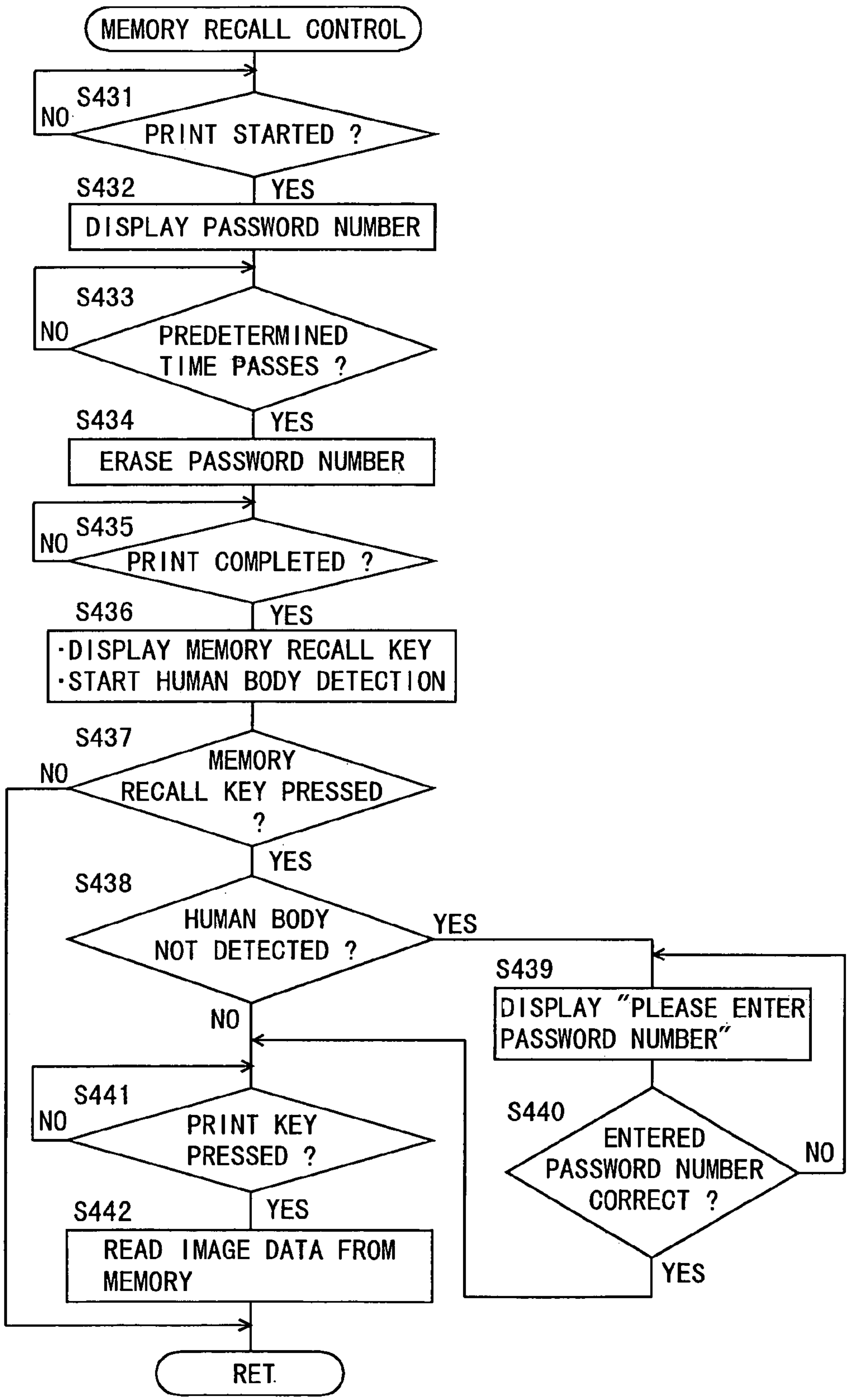

APPARATUS AND METHOD FOR RE-OUTPUTTING IMAGE DATA UNDER DIFFERENT CONDITIONS DEPENDING ON TIME PASSING FROM OUTPUT OF THE IMAGE DATA

This application is based on application No. 11-295173 filed in Japan, the contents of which is hereby incorporated by reference.

BACKGROUND OF THE INVENTION

1. Field of the Invention

The present invention relates to apparatuses and methods for outputting image data. In particular, the invention relates to an image data outputting apparatus and an image data outputting method for outputting image data again, which has once been output and stored in the apparatus, by a simple control method while ensuring confidentiality.

2. Description of the Related Art

Examples of the image data outputting apparatus include a printer which outputs image data taken in by a scanner and the like as an image, as well as a facsimile device which outputs taken image data directly to another device.

There is also a printing system for multiple purposes as one of conventional image data outputting apparatuses. The conventional printing system stores image data in a memory such as hard disk and DRAM (dynamic random access memory) and then performs image processing on the image data to be printed out. The image data is stored in the memory by taking in the image data from any resource such as image scanner and personal computer and writing the image data in a hard disk and thereafter writing it in a DRAM, or directly writing the image data in the DRAM. After image processing on the image data read from the DRAM, the image data is output through printing out or transmission of the image data to another device such as facsimile.

Some conventional image data outputting apparatus has memory recall function. The memory recall function allows image data, which was once output and held in a DRAM or hard disk, to be read from the memory and output according to a request by an operator to output the image data again. For such an image data outputting apparatus, various studies have been done in order to achieve re-output of stored image data following a request by a particular person only, i.e., to maintain confidentiality.

Detailed description is given below concerning conventional image data outputting apparatuses which have the function of ensuring confidentiality.

A first example of such image data outputting apparatuses is an image forming apparatus disclosed in U.S. Pat. No. 5,726,770. When this image forming apparatus reads an image, a personal identification number can be input. Then, image data and a print mode concerning this image are stored together with the personal identification number. By input of the personal identification number, the image data stored together with the personal identification number and the print mode can be output at any arbitrary time in accordance with the stored print mode.

The above image forming apparatus outputs image data on condition that a personal identification number is entered. Therefore, the stored image data is never output freely by any third person. In other words, confidentiality of the stored image data can be protected.

However, this image forming apparatus requires input of a personal identification number each time image data is to be output, and thus has a problem of significantly poor operability especially when an image which was read at an immediately preceding time should be printed out repeatedly, for example, when an image is to be printed out after a trial printing.

A second example is an image forming apparatus disclosed in Japanese Patent Laying-Open No. 7-221949. This image forming apparatus has a human body detection sensor to control image data such that stored image data is erased in response to a non-sensing signal from the human body detection sensor.

A third example is an image forming apparatus disclosed in Japanese Patent Laying-Open No. 9-284518. This image forming apparatus erases stored image data according to execution of a predetermined operation or when a predetermined time has passed from execution of a copying operation.

The respective image forming apparatuses mentioned above as the second and third examples of conventional apparatuses erase stored image data in order to prevent the image data from being output freely by a third person. In other words, confidentiality of the stored image data can be preserved.

These image forming apparatuses, however, have a problem of poor usability since image data is erased and accordingly a certain operation to store the image data is required, when the erased image data should be output again.

The conventional image data outputting apparatuses have thus a problem of poor operability and usability in terms of guarantee of confidentiality of stored image data.

SUMMARY OF THE INVENTION

The present invention is devised to address these actual situations. One object of the invention is to provide an image data outputting apparatus and an image data outputting method for outputting image data stored in the apparatus again by a simple control method while ensuring confidentiality.

According to one aspect of the invention, an image data outputting apparatus includes a memory storing image data, an output unit outputting the image data stored in the memory, a control unit controlling operation of the output unit, a password store unit storing a password corresponding to the image data, and an input unit for entering information. The control unit has a feature in its operation carried out when it receives a re-output instruction, after certain image data stored in the memory is output, for causing the output unit to output that certain image data again. Specifically, the control unit operates in a first mode, when it receives the re-output instruction before a predetermined time passes from output of the certain image data, to cause the output unit to output the image data again in response to reception of the re-output instruction. The control unit operates in a second mode, when it receives the re-output instruction after the predetermined time passes from output of the certain image data, to cause the output unit to output the image data again on condition that a password stored in the password store unit that corresponds to the image data is entered in the input unit.

According to the present invention, after certain image data is output, the image data can be output again if a predetermined time does not pass, without input of a password. After the predetermined time period from output of the image data, a password should be entered for outputting the image data again. In other words, re-output of image data requires input of a password in principle, while an operator is not required, in a period during which confidentiality of the image data can supposedly be ensured, to carry out a troublesome manipulation to enter a password for re-output of the image data. The period during which confidentiality of the image data can supposedly be ensured corresponds to the predetermined time explained above. Preferably, the predetermined time is a period in which it is supposed that an operator, who operated the image data outputting apparatus to output certain image data, still operates the image data outputting apparatus. Here, confidentiality of the image data can supposedly be ensured, for example, when the same operator successively operates the apparatus to output and re-output the image data.

In this way, the image data outputting apparatus can output image data again, that is stored in the apparatus, by a simple control method while ensuring confidentiality.

According to another aspect of the invention, an image data outputting apparatus includes a memory storing image data, an output unit outputting the image data stored in the memory, a control unit controlling operation of the output unit, a password store unit storing a password corresponding to the image data, an input unit for entering information, and an operator detection unit detecting presence/absence of an operator. The control unit operates as described below, when it receives a re-output instruction, after certain image data stored in the memory is output, for causing the output unit to output the certain image data again. Specifically, the control unit operates in a first mode, when it receives the re-output instruction in a period during which the detection unit keeps detecting presence of an operator after output of the certain image data stored in the memory, to cause the output unit to output the image data again in response to reception of the re-output instruction. The control unit operates in a second mode, when it receives the re-output instruction after the detection unit detects absence of an operator after the certain image data is output, to cause the output unit to output the image data again on condition that a password is entered in the input unit. The password here refers to the one stored in the password store unit and corresponds to the certain image data.

According to the present invention, after certain image data is output, the image data can be output again without input of a password if an operator is kept detected. After output of the image data, if absence of the operator is detected once, input of a password is required for outputting the image data again. In other words, re-output of image data requires input of a password in principle, while an operator is not required to carry out a troublesome manipulation to enter a password for re-output of the image data in a period during which confidentiality of the image data can supposedly be ensured. Here, the period during which confidentiality of the image data can supposedly be ensured corresponds to a period in which it is supposed that the same operator manipulates the apparatus.

In this way, the image data outputting apparatus can output image data again, which is stored therein, by a simple control method while ensuring confidentiality.

According to still another aspect of the invention, a method of outputting image data is defined, which is carried out when a re-output instruction is received, after certain image data stored in a memory is output, for outputting the certain image data again. Specifically, if the re-output instruction is received before the predetermined time passes from output of the certain image data, the image data is output again. If the re-output instruction is received after a predetermined time passes from output of the certain image data, the image data is output again on condition that a password corresponding to the image data is entered.

According to the present invention, after certain image data is output, the image data can be output again if a predetermined time has not passed, without input of a password. After the predetermined time period from output of the image data, a password should be entered for outputting the image data again. In other words, re-output of image data requires input of a password in principle, while an operator is not required, in a period during which confidentiality of the image data can supposedly be ensured, to carry out a troublesome manipulation to enter a password for re-output of the image data. The period during which confidentiality of the image data can supposedly be ensured corresponds to the predetermined time explained above. The predetermined time can be defined as a period in which it is supposed that an operator, who operated an image data outputting apparatus to output certain image data, still operates the image data outputting apparatus. Here, confidentiality of the image data can supposedly be ensured, for example, when the same operator successively operates the apparatus to output and re-output the image data.

In this way, image data which has been stored in a memory and output already, can be output again, by a simple control method while ensuring confidentiality.

According to a further aspect of the invention, a method of outputting image data is defined, which is carried out when a re-output instruction is received, after certain image data stored in a memory is output, for outputting the certain image data again. Specifically, if the re-output instruction is received in a period during which presence of an operator is kept detected after output of the certain image data, the image data is output again in response to reception of the re-output instruction. If the re-output instruction is received after absence of an operator is detected after the certain image data is output, the image data is output again on condition that a password corresponding to the image data is entered.

According to the present invention, after certain image data is output, the image data can be output again without input of a password if an operator is kept detected. After output of the image data, if absence of the operator is detected once, input of a password is required for outputting the image data again. In other words, re-output of image data requires input of a password in principle, while an operator is not required to carry out a troublesome manipulation to enter a password for re-output of the image data in a period during which confidentiality of the image data can supposedly be ensured.

In this way, the image data outputting apparatus can output image data again, which is stored therein, by a simple control method while ensuring confidentiality.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram showing a structure of a print processing unit of the copying machine shown in FIG. 1.

FIG. 10 is a flowchart showing a subroutine of a modification of the memory recall control process in FIG. 7.

DESCRIPTION OF THE PREFERRED EMBODIMENTS

First Embodiment

Figure 1:
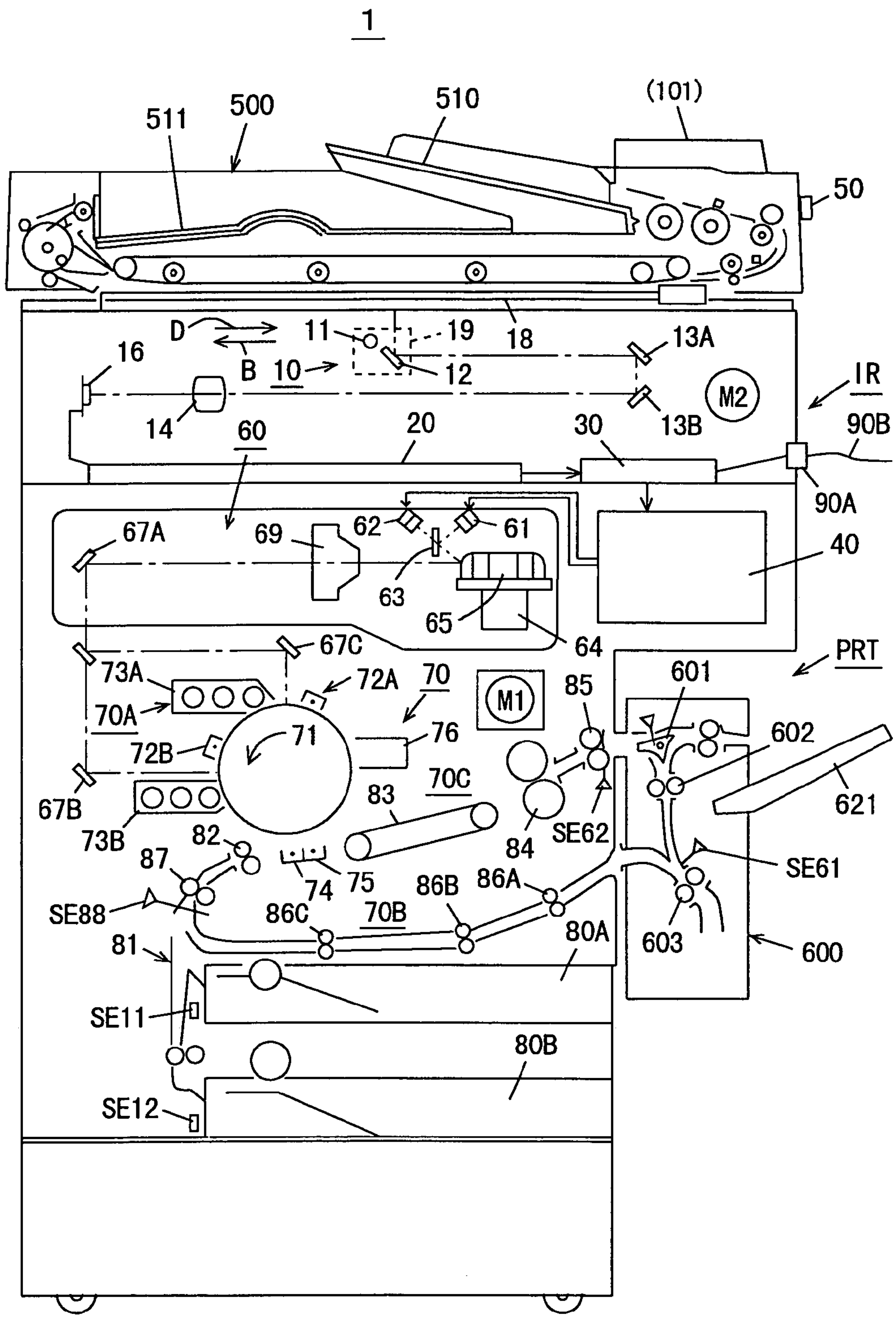
FIG. 1 generally shows a cross section of a copying machine according to one embodiment of the present invention.

FIG. 1 is a cross section showing an entire structure of a copying machine 1 as one example of image forming apparatuses according to the present invention.

Referring to FIG. 1, copying machine 1 includes: a scan system 10 reading an original document and converting it into an image signal; an image signal processing unit 20 processing the image signal sent from scan system 10; an image memory unit 30 storing image data input from image signal processing unit 20; a print processing unit 40 driving semiconductor lasers 61 and 62 based on the image data input from image memory unit 30; an optical system 60 synthesizing two laser beams from respective semiconductor lasers 61 and 62 and directing the resultant beam onto a predetermined exposure position on a photoreceptor drum 71; and an image forming system 70 developing a latent image formed by exposure, and transferring and fixing it onto a sheet of paper to form an image. Copying machine 1 further includes: an operation panel 101 provided on the top surface of its body (the operation panel being placed on the top surface of copying machine 1 (in a direction perpendicular to the plane of this drawing)); a human body detection sensor 50 provided on one side of the body of copying machine 1; an original document transport unit 500 transporting an original document and reversing the document if necessary; and a re-feed unit 600 for supplying a sheet to a transfer position for the second time.

An image reader IR is constituted of scan system 10, image signal processing unit 20 and the like and a printer PRT is constituted of print processing unit 40, optical system 60, image forming system 70 and the like.

Scan system 10 is constituted of an exposure lamp 11 and a first mirror 12 that are incorporated into a scanner 19 moving under a platen glass 18, fixed mirrors 13A and 13B, a collective lens 14, a photoelectric conversion device 16 employing a charge coupled device (CCD) array and the like, a scan motor M2, and the like.

Photoelectric conversion device 16 converts an image of a non-specified color which is mainly a black in an original document and an image of a specified color (red) in the original document respectively into electric signals.

Image signal processing unit 20 processes image signals output from photoelectric conversion device 16 and outputs image data to image memory unit 30.

Print processing unit 40 supplies image data sent thereto to semiconductor lasers 61 and 62. Optical system 60 is constituted of semiconductor lasers 61 and 62, a dichroic mirror 63 synthesizing two laser beams of respective semiconductor lasers 61 and 62, a polygon mirror 65 polarizing the synthesized laser beam, a motor 64 rotating polygon mirror 65, a main lens 69, reflection mirrors 67A, 67B and 67C, and the like.

Image forming system 70 is constituted of a develop and transfer system 70A, a transport system 70B, and fixing system 70C.

Develop and transfer system 70A is formed of photoreceptor drum 71 driven to rotate counterclockwise on FIG. 1, as well as a first corona charger 72A, a first development unit 73A, a second corona charger 72B, a second development unit 73B, a transfer charger 74, a separation charger 75, a cleaning unit 76 and the like, that are arranged around photoreceptor drum 71 in this order from the upstream side relative to the rotational direction of the drum. The first development unit 73A contains two-component developer consisting of toner and carrier.

Transport system 70B is formed of cassettes 80A and 80B holding sheets of paper, size detection sensors SE11 and SE12 detecting sheet size, a sheet guide 81, a timing roller 82, a transport belt 83, horizontal transport rollers 86A–86C transporting a sheet supplied from re-feed unit 600, and the like.

Fixing system 70C is formed of a fixing roller 84 transporting a toner image on a sheet while fixing the toner image by heat and pressure, a discharge roller 85, a discharge sensor SE62 detecting discharge of a sheet, and the like.

Re-feed unit 600 is of circulation type that temporarily keeps a sheet discharged from discharge roller 85 and supplies the sheet to horizontal transport roller 86A of transport system 70B for the second image formation (printing), reversing the sheet for a double-sided mode and without reversing the sheet for a composite mode. Re-feed unit 600 is constituted of a switch claw 601 for switch between discharge to a discharge tray 621 and re-feed of a sheet, a transport roller 602, a reverse roller 603, a reverse sensor SE61, and the like.

In the double-sided mode, the left end of switch claw 601 is moved upward by a solenoid (not shown). Accordingly, a sheet discharged from discharge roller 85 is directed toward transport roller 602, that passes through transport roller 602 to reach reverse roller 603.

When the trailing edge of the sheet reaches reverse sensor SE61, reverse roller 603 reverses to cause the sheet to be transported toward horizontal transport roller 86A and passed through horizontal transport rollers 86B and 86C and an intermediate roller 87 to timing roller 82 where the sheet is put on standby.

At this time, subsequent sheets are also transported successively at predetermined intervals. The number of single-sided printed sheets, which can be on standby in a copy path including transport rollers 602 and 603 and horizontal transport rollers 86A–86C, depends on the length of the sheets and the copy path if there is no delay of image data. According to this embodiment, the maximum number of sheets which can be on standby is three. A sensor SE88 is placed in front of intermediate roller 87 for detecting the leading end of a supplied sheet.

Original document transport unit 500 automatically transports an original document set on a document feed tray 510 to platen glass 18, and discharges the document to a document discharge unit 511 after the front side (bottom side) of the document is read by scanner 19.

Data read by image reader IR is input to image memory unit 30 to be stored therein.

Image memory unit 30 is connected to a communication line 90B via a connector 90A. Copying machine 1 can thus transmit and receive data to and from another device via communication line 90B. Specifically, copying machine 1 can form an image based on image data transmitted from another device and can transmit image data read by scanner 19 and stored in image memory unit 30 to another device.

When scanner 19 moves in copying machine 1 in the direction indicated by the arrow B, the speed of movement is higher than that when scanner 19 moves in the direction of the arrow D. Scanning of an image by photoelectric conversion device 16 when scanner 19 moves in the direction B is referred to as preliminary scan, by which the size and position of an original document on the platen glass are detected based on image data output from photoelectric conversion device 16. Scanning of an image by photoelectric conversion device 16 when scanner 19 moves in the direction D is main scan, by which image data of an original document is read based on image data output from photoelectric conversion device 16.

Human body detection sensor 50 is provided for detecting any object (i.e., operator) near copying machine 1. Human body detection sensor 50 can be structured, as disclosed in Japanese Patent Laying-Open No. 7-22194 for example, by using a known photosensor which is a combination of a light-emitting device and a light-receiving device.

Figure 2:
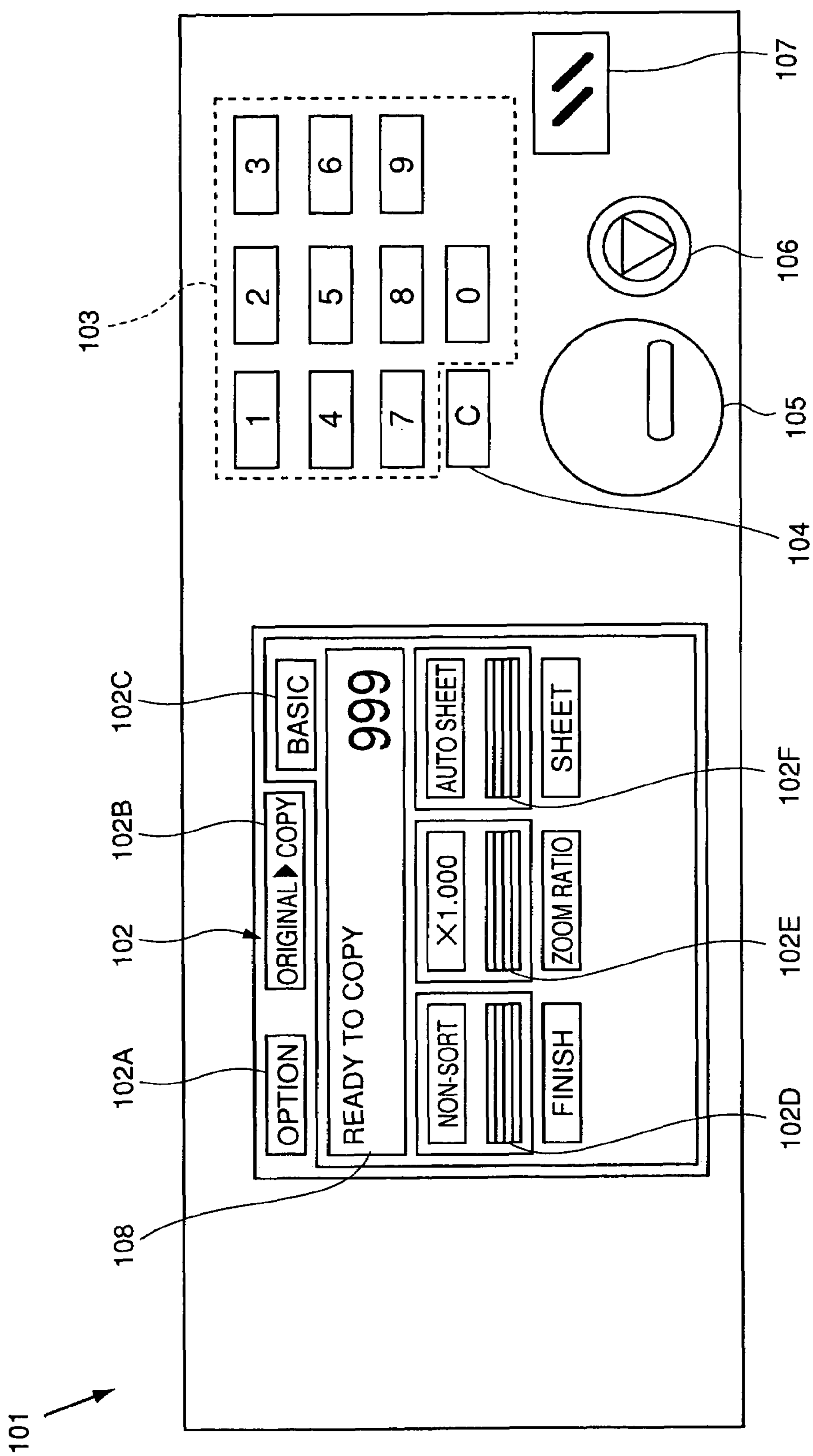
FIG. 2 is a plan view of an operation panel of the copying machine shown in FIG. 1.

FIG. 2 shows operation panel 101 provided to copying machine 1 in FIG. 1. Operation panel 101 includes a touch panel 102 constituted of an LCD (liquid crystal display) on which various pictures as well as messages are displayed, a ten key pad 103 for entering numeric values such as the number of copies to be made, zoom ratio, and the like, a clear key 104 for setting at "1" the number of copies to be made entered by means of ten key pad 103 or clearing an entered zoom ratio, a print key 105 for staring printing operation, a stop key 106 for stopping successive printing operation, and a panel reset key 107 being pressed for canceling all of the copy conditions which have been set in order to return to an initial state.

On touch panel 102, an option key 102A, an "original → copy" key 102B, a basic key 102C, a finish key 102D, a zoom key 102E, and a sheet key 102F are displayed. Option key 102A is pressed, when a plurality of original documents are to be copied, for using another copy sheet such as color paper and the like for only the front page. "Original copy" key 102B is pressed for designating a combination of a document type and a type of copy to be made. Basic key 102C is pressed for setting fundamental conditions for making a copy such as copy sheet type, zoom ratio, copy density and the like. Finish key 102D is provided for setting a type of sorting copies. Zoom key 102E is provided for setting copy zoom ratio, and sheet key 102F is provided for designating any sheet to be used as a copy sheet.

A message display section 108 is further displayed on touch panel 102. On message display section 108, a message indicating any current state of copying machine 1 and the like, as well as copy conditions such as the number of copies to be made, are displayed.

FIG. 3 is a block diagram showing a structure of print processing unit 40 of copying machine 1.

Print processing unit 40 is constituted of an operation panel unit 110, a general control unit 120, a reading unit 130, a print unit 140, and a communication controller unit 150. Respective blocks serially communicate with each other via communication drivers 111, 121, 131 and 141 and a communication cable C1 for transmitting and receiving command and status. Respective blocks include central processing units (CPU) 112, 122, 132 and 142, read only memories (ROM) 113, 123, 133 and 143 storing respective programs, and random access memories (RAM) 114, 125, 134 and 144 functioning as work areas for execution of the programs. General control unit 120 includes a timer 124 for timing one routine in a main routine.

Operation panel unit 110 is a block for controlling operation panel 101 and human body detection sensor 50. Specifically, operation panel unit 110 reads details entered by various operation keys on operation panel 101 or touch panel 102 and displays the entered details and any operating state of copying machine 1 on the light emitting diode (LED) or LCD. Further, operation panel unit 110 reads whether or not human body detection sensor 50 detects an object (operator). Here, information input by a user by means of keys or touch panel 102 is transmitted as conditions for forming an image to general control unit 120 through communication cable C1. Result of detection by human body detection sensor 50 is transmitted as a condition for determining whether an operator is present or not through communication cable C1 to general control unit 120.

Reading unit 130 controls scan system 10 and document transport unit 500 described above. Specifically, reading unit 130 detects, through an input/output (I/O) circuit 135, the state in which a document is transported as well as whether a document is set on document transport unit 500, and controls, through an input/output circuit 136, a document drive circuit and a mirror drive circuit for scanning a document, for example. Image data read by CCD 16 is transmitted to image memory unit 30 via an input signal processing unit 137.

Print unit 140 controls printer PRT mentioned above. Print unit 140 detects the size and state of transportation of a sheet through an input/output circuit 145 and controls the state of transporting a sheet through a sheet drive circuit 146. Print unit 140 drives semiconductor lasers (LD) 61 and 62 according to data transmitted to a print processing unit 147. In this way, print unit 140 controls printer PRT to carry out processes of feeding papers, development, transfer and fixing in copying machine 1 so as to form an image on a desired sheet of paper.

General control unit 120 controls the overall copying machine 1 while managing an image read by image reader IR and managing image data transmitted via transmission controller unit 150 from a transmission unit (a device on local area network (LAN)1–LAN3) connected with copying machine 1. General control unit 120 includes image memory unit 30 storing images corresponding to documents from several hundreds to several thousands in number that are read by image reader IR. Image data transmitted from input signal processing unit 137 of reading unit 130 through a bus D1 or image data transmitted from communication controller unit 150 is stored in image memory unit 30.

General control unit 120 further includes a print mode memory 126 and a password number memory 127.

Print mode memory 126 stores a print mode employed when each image data is output from copying machine 1 for the first time, such that the print mode is correlated with the image data. Image data may be output as an image from copying machine 1 or may be output as it is (directly as image data) from copying machine 1.

Password number memory 127 stores a password number determined correspondingly to each image data. As explained below, when a certain time passes after each image data is output as an image or directly as image data to another device, copying machine 1 can output the image data again on condition that a password number corresponding to this image data is input. The function of copying machine 1 that image data which has once been output can be output again is herein referred to as "memory recall."

As shown in FIG. 3, copying machine 1 is connected to three LANs (LAN1–LAN3) via communication controller unit 150. Copying machine 1 can thus form (make a print of) an image according to image data transmitted from respective personal computers on LAN 1-LAN3.

Copying machine 1 can store in image memory unit 30 image data read by image reader IR and image data transmitted from communication controller unit 150. Copying machine 1 accordingly has a structure which allows a plurality of prints to be made by transmitting the same image data from image memory unit 30 multiple times, i.e., by reading an image once. In addition, since image memory unit 30 has its capacity capable of storing image data of many documents all together, read images can be printed with the order changed. The procedure of printing operation is stored in a table within RAM 125 of general control unit 120. Printing of image data read by image reader IR and image data transmitted from communication controller unit 150 is controlled with reference to the table stored in RAM 125.

General control unit 120 sends commands to operation panel unit 110, reading unit 130 and print unit 140 to carry out general reading operation and printing operation. Processes performed here are similar to the control in the conventional digital copying machine and description thereof is not given here.

Figure 4:
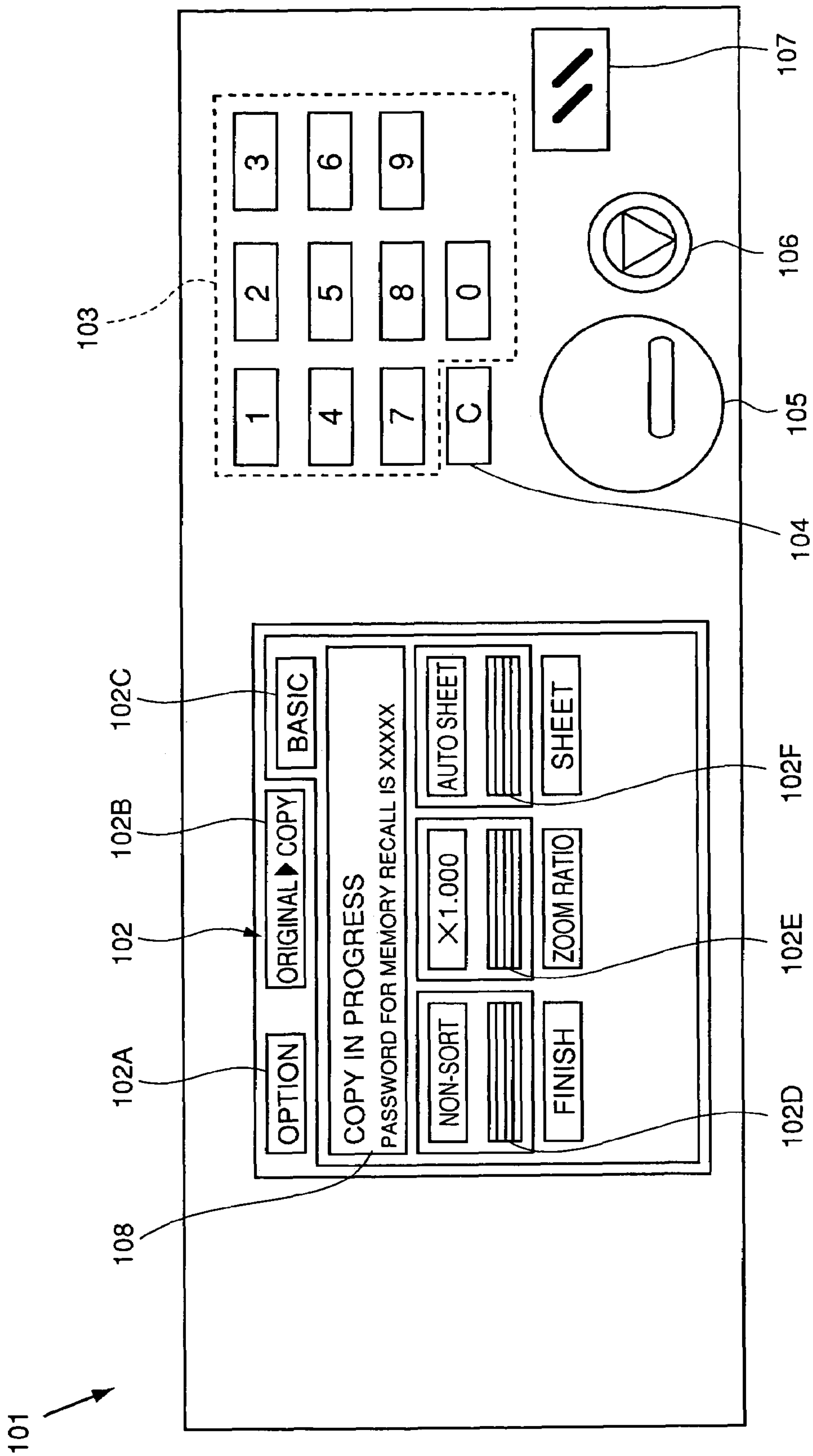
FIGS. 4, 5 and 6 respectively show examples of display on the operation panel shown in FIG. 2.
Figure 5:
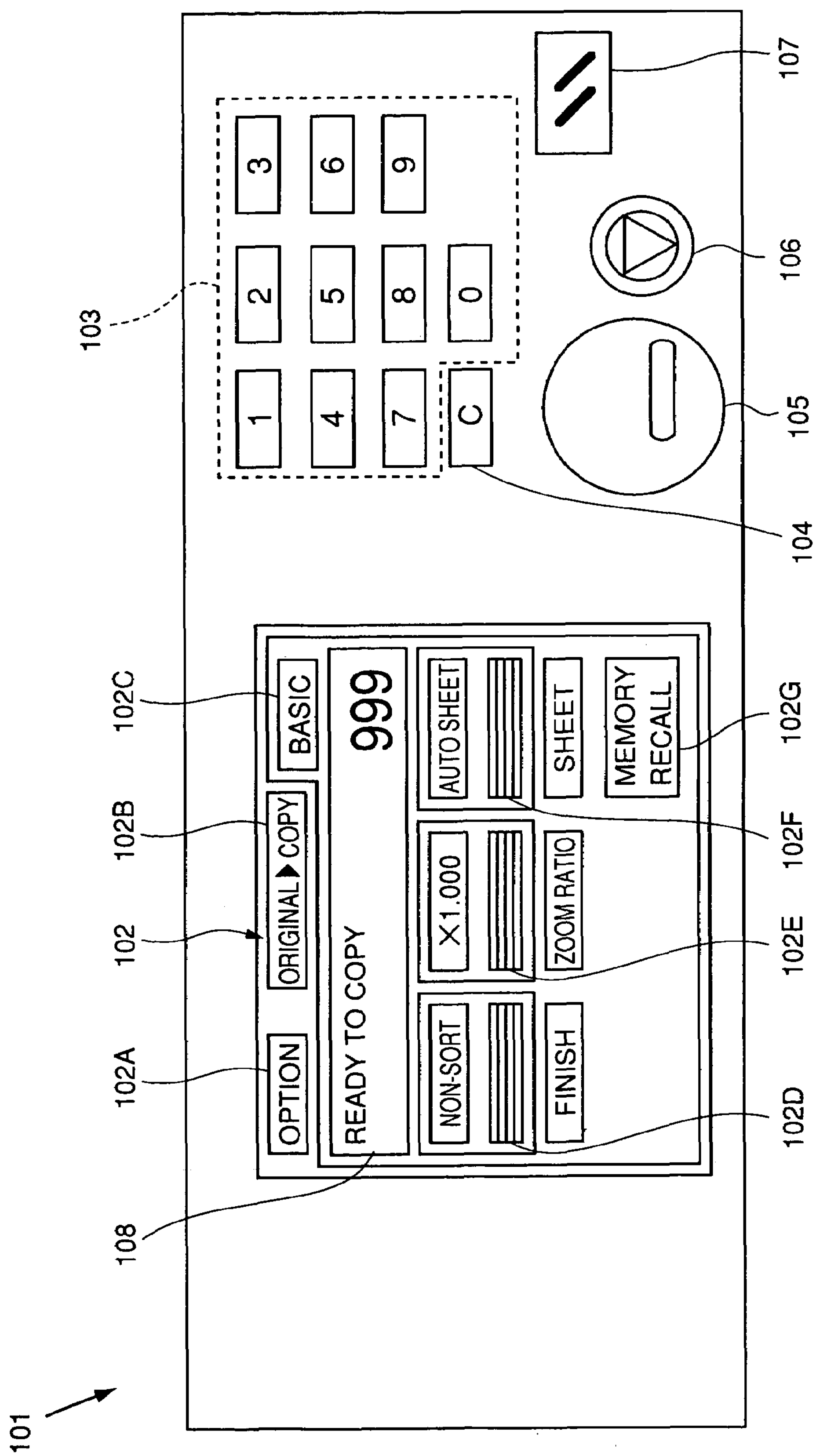
Figure 6:
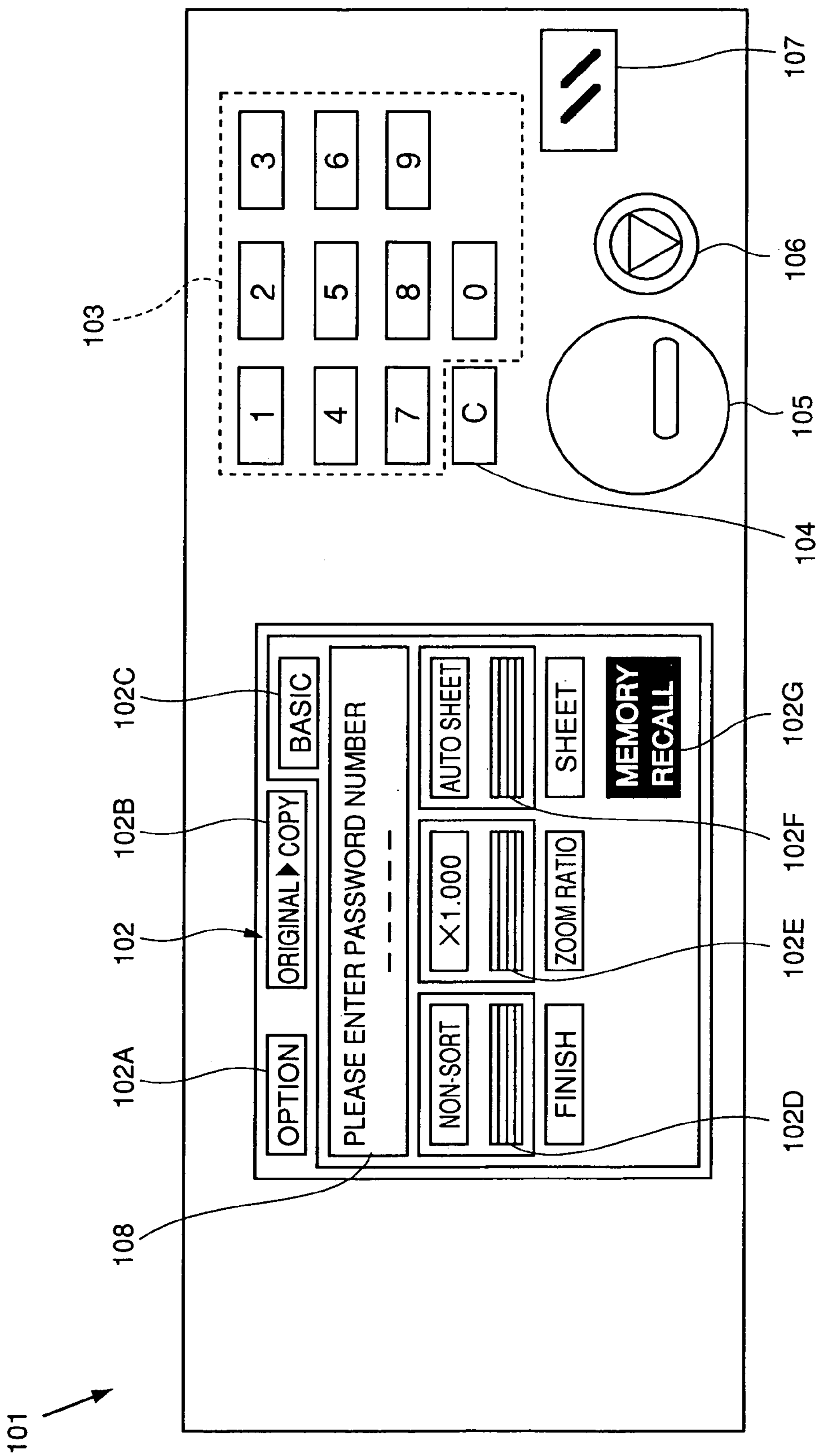
Figure 7:
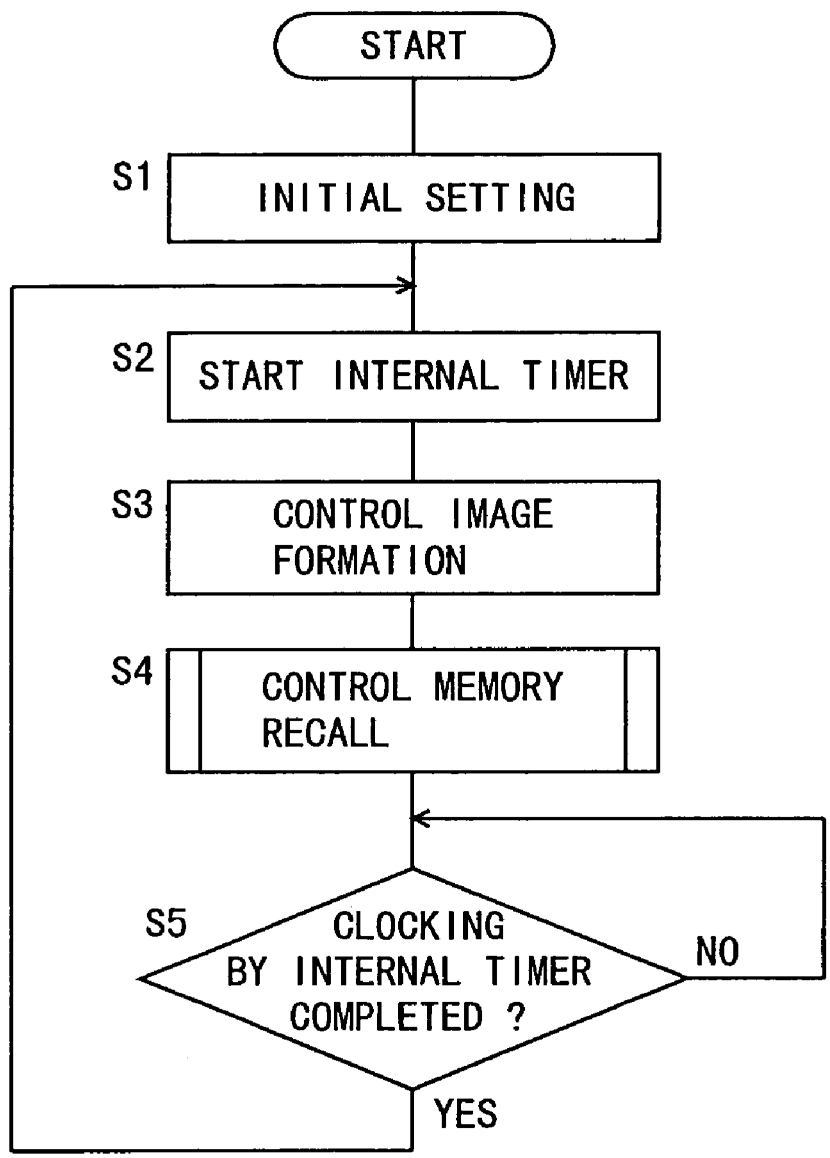
FIG. 7 is a flowchart showing a main routine followed by a CPU of a general control unit in FIG. 3.
Figure 8:
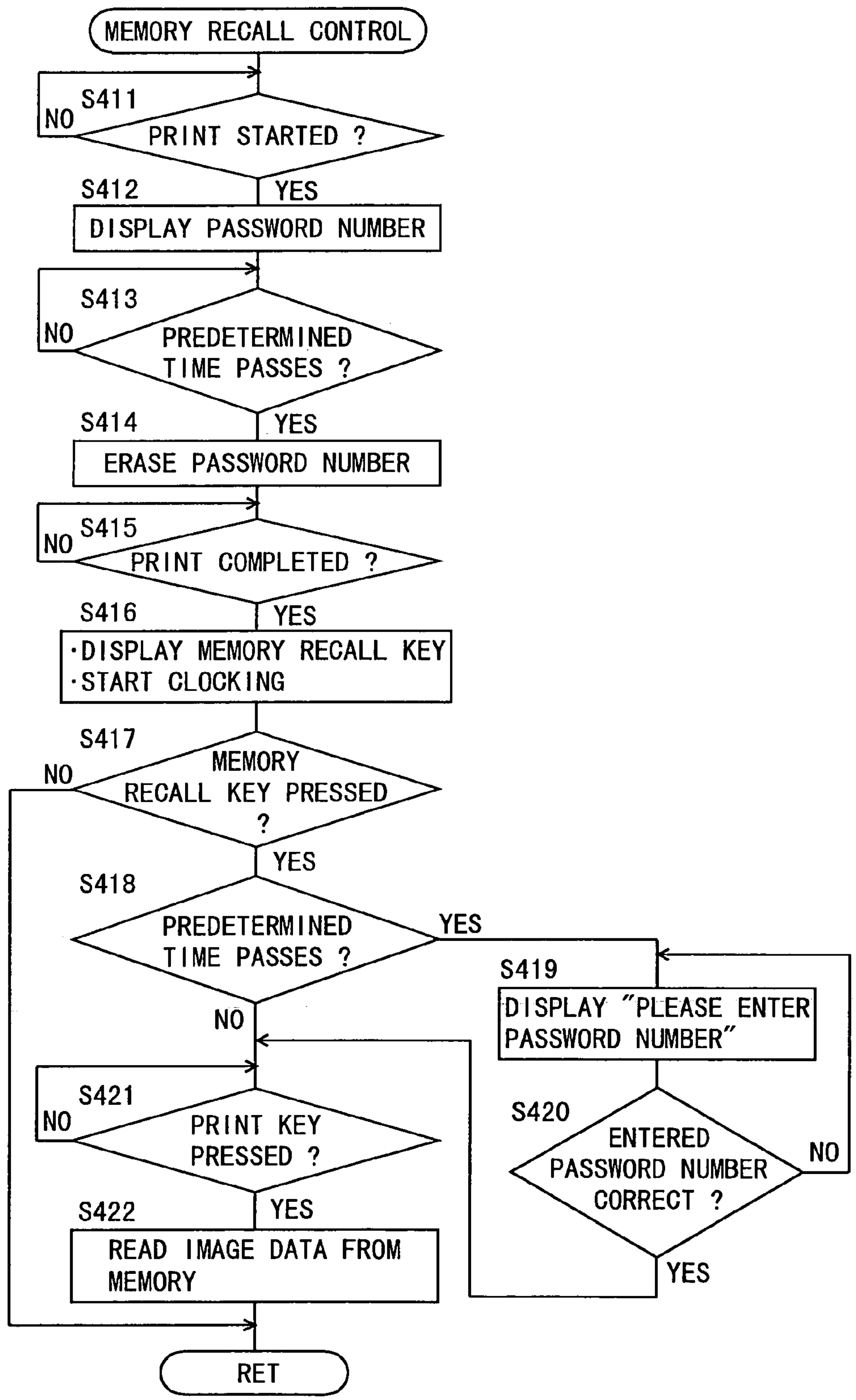
FIG. 8 is a flowchart showing a subroutine of a memory recall control process in FIG. 7.

With regard to copying machine 1, the manner in which display is made on touch panel 102 changes. FIGS. 4 to 6 show examples of display on touch panel 102. FIGS. 7 and 8 show details of control by CPU 122 of general control unit 120. The details of control by CPU 122 are described below in conjunction with FIGS. 4 to 6.

FIG. 7 is a flowchart of a main routine followed by CPU 122.

When power is applied to copying machine 1, CPU 122 performs initial setting such as reset of each memory and the like in step S1 (hereinafter "step" is abbreviated) and then proceeds to S2. CPU 122 starts timer 124 in S2 and proceeds to S3.

CPU 122 performs an image formation control process in S3 which is a process for reading of image data and the like based on information input to operation panel 101, and then proceeds to S4.

CPU 122 then performs a memory recall control process in S4 and proceeds to S5. The memory recall control process refers to a process in which the memory recall function described above is used. Details of the memory recall control process are discussed below in conjunction with FIG. 8.

CPU 122 determines in S5 whether clocking of one routine by the internal timer is completed, and returns to S2 if it determines that clocking is completed.

Referring to FIG. 8, details of the memory recall control process in S4 are now described. FIG. 8 is a flowchart of a subroutine of the memory recall control process.

CPU 122 first determines in S411 whether or not printing operation (image forming operation) is started by pressing of print key 105 of copying machine 1. If CPU 122 judges that the printing operation is started, it proceeds to S412 to display on message display section 108 a password number corresponding to image data currently used for making a print as shown in FIG. 4, and then proceeds to S413.

In the printing operation, suitable image data in image memory unit 30 is compressed to be stored in a packet memory (not shown) in general control unit 120 (see FIG. 3). The image data stored in the packet memory is successively read following a mode designated by operation panel 101, and then expanded to be plotted in a page memory (not shown) in general control unit 120. The expanded and plotted image data is transmitted to print processing unit 147 in print unit 140 (see FIG. 3) and output as an image. The password number is a random code determined by CPU 122 of copying machine 1, for example, a combination of random numerals or characters and the like.

CPU 122 which displays the password number in S412 then determines in S413 whether or not a predetermined time has passed. If CPU 122 judges that the predetermined time has passed, it proceeds to S414. CPU 122 erases the display of the password number on message display section 108 in S414 and proceeds to S415. The predetermined time in S413 corresponds to the time for which a password number is displayed and fixed at approximately several minutes for example.

CPU 122 determines in S415 whether or not the printing operation is completed. If CPU 122 judges that the printing operation is completed, it proceeds to S416 to display memory recall key 102G on touch panel 102 as shown in FIG. 5 and then proceeds to S417. In S416, CPU 122 starts the internal timer.

In S417, CPU 122 determines whether memory recall key 102G is pressed or not. If CPU 122 judges that the key is pressed, it proceeds to S418. Memory recall key 102G is pressed when an operator intends to output image data again that has already been output. The operator selects any image data to be output again when the operator presses memory recall key 102G.

In S418, CPU 122 determines, based on pressing of memory recall key 102G, whether a predetermined time has passed from the time when image data to be output again was output for the first time. This is determined by judging whether clocking of the internal timer started in S106 is completed. If CPU 122 determines that the predetermined time has not passed, it proceeds to S421, and proceeds to S419 if it determines that the predetermined time has passed.

In S421, CPU 122 determines whether print key 105 is pressed or not. If CPU 122 judges that the key is pressed, CPU 122 causes the appropriate image data to be read from image memory unit 30 and returns.

In S419, as shown in FIG. 6, a message for instructing an operator to enter a password number such as "please enter password number" is displayed on message display section 108 and then S420 is carried out. It is noted that memory recall key 102G is indicated as a reversed display in FIG. 6.

In S420, CPU 122 determines whether or not the entered password number is correct. If CPU 122 judges that the password number is correct, it proceeds to S421 and proceeds to S419 if the password number is incorrect.

Following the memory recall control process described above, if memory recall key 102G is pressed before a predetermined time passes from start of the first printing operation for image data to be output again, that image data is directly output again. On the other hand, if memory recall key 102G is pressed after that predetermined time passes, that image data is output again on condition that a password number corresponding to the image data is entered.

The output operation here is not limited to the printing operation and may include transmission of image data to another device. If image data printed first is to be output again by being transmitted to another device, the process in S421 is replaced with a process of determining whether any manipulation for transmitting the image data to another device is carried out. If image data transmitted to another device first is to be output again by being printed, the process in S411 is replaced with a process of determining whether transmission is started or not.

According to this embodiment discussed above, CPU 122 constitutes a control unit and the printer unit outputting an image based on image data constitutes an output unit. The transmission unit (device on LAN1–LAN3) and communication controller unit 150 that output image data directly to another device via communication line 90B also constitute the output unit.

According to this embodiment, CPU 122 constitutes the password number determining unit. Although a password number is entered for outputting stored image data again, entered password is not limited to the password number, and any personal identification code including characters and the like may be entered.

Further, according to this embodiment, the password number is designated by copying machine 1. However, an operator may determine the password number. In this case, the process in S412 is replaced with a process of instructing an operator to enter a password number and displaying the entered password number. This process is described in detail below in conjunction with FIG. 9.

Figure 9:
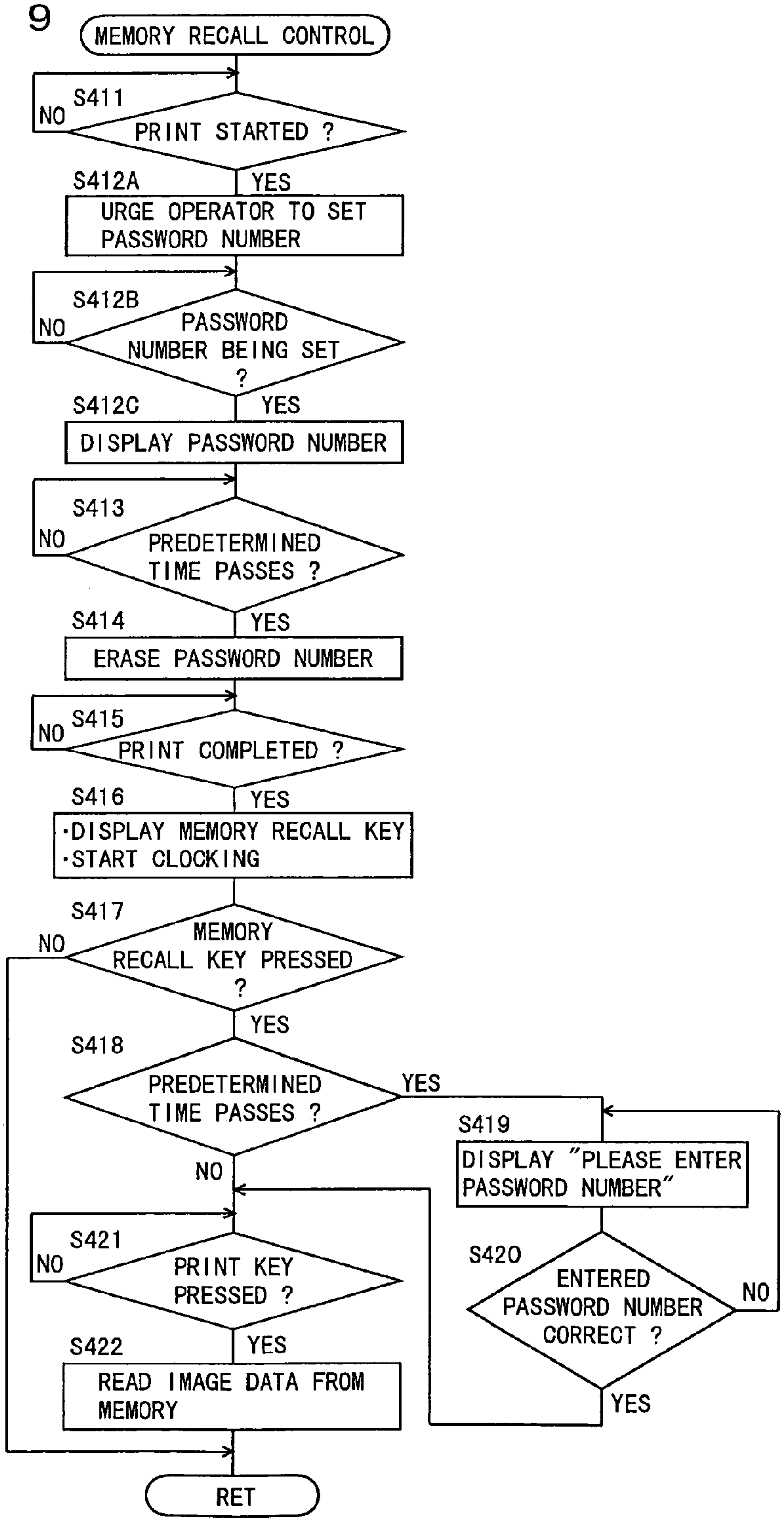
FIG. 9 is a flowchart showing a modification of the memory recall control process in FIG. 8.

According to the processes shown in FIG. 9, S412 in the memory recall control shown in FIG. 8 is replaced with S412A–S412C. Only the difference between respective memory recall control processes shown in FIGS. 8 and 9 is now explained.

Referring to FIG. 9, CPU 122, which has judged that printing operation is started in S411, urges an operator to set a password number in S412A and proceeds to S412B. CPU 122 causes message display section 108 to indicate a message such as "please set password number" in the process of S412A. Further, in the process of S412A, CPU 122 may instruct an operator to set the password number in accordance with types of characters applicable to the password number as well as the number of digits of the password number, the types and digit number being designated by CPU 122.

In S412B, CPU 122 determines whether the operator has set the password number. If CPU 122 judges that the password number is set, it proceeds to S412C.

In S412C, CPU 122 causes message display section 108 to display the password number which is judged as being set in S412B and then proceeds to S413.

Second Embodiment

The second embodiment according to the present invention is hereinafter described. The second embodiment is different from the first embodiment in the process of memory recall control only, and only this difference is discussed below.

FIG. 10 is a flowchart showing a subroutine of the memory recall control process according the second embodiment.

Referring to FIG. 10, CPU 122 determines first in S431 whether printing operation is started or not. If CPU. 122 judges that the printing operation is started, it proceeds to S432. In S432, CPU 122 causes message display section 108 to display a password number corresponding to image data which is currently printed and then proceeds to S433. In S433, CPU 122 determines whether a predetermined time has passed from start of the printing operation in S431. This predetermined time may be equivalent to the predetermined time explained in conjunction with S413 (see FIG. 8). If CPU 122 judges that the predetermined time has passed, it proceeds to S434 in which the password number displayed in S432 is erased and then proceeds to S435.

In S435, CPU 122 determines if the printing operation is completed, which has been judged as being started in S431. If CPU 122 judges that the printing operation is completed, it proceeds to S436.

In S436, CPU 122 causes touch panel 102 to display memory recall key 102G as shown in FIG. 5, starts detection of presence/absence of an operator by human body detection sensor 50 and proceeds to S437.

In S437, CPU 122 determines whether or not memory recall key 102G is pressed. If pressed, CPU 122 proceeds to S438. If not, CPU 122 once returns.

In S438, CPU 122 determines whether sensor 50 detects absence of an operator at least once, the detection being started in S436. If CPU 122 judges that absence of an operator is detected at least once, it proceeds to S439. On the other hand, if CPU 122 judges that absence of an operator is never detected, in other words, presence of an operator is kept detected, CPU 122 proceeds to S441.

In S439, CPU 122 causes message display section 108 to display a message for urging an operator to enter a password number as shown in FIG. 6, and proceeds to S440. In S440, CPU 122 determines whether or not the entered password number is correct. If correct, CPU 122 proceeds to S441. If incorrect, CPU 122 returns to S439.

In S441, CPU 122 determines whether print key 105 is pressed or not. If pressed, CPU 122 proceeds to S442 in which appropriate image data is read from image memory unit 30, and returns.

Following the memory recall control process according to the second embodiment of the invention, if memory recall key 102G is pressed, in the period during which an operator carries on with operation of copying machine 1 after start of the first printing operation for image data to be output again, that image data is directly output. On the other hand, if it is judged that the operator leaves copying machine 1 at least once after start of the first printing operation and accordingly operation by the operator does not continue, the image data is output again on condition that a password number corresponding to the image data is entered.

The output operation here is not limited to the printing operation, and may include transmission of image data to another device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image data outputting apparatus comprising:

a memory storing image data;

an output unit outputting the image data stored in said memory;

a control unit controlling operation of said output unit;

a password store unit storing a password corresponding to the image data; and an input unit for entering information, wherein when said control unit receives a re-output instruction, after a certain image data stored in said memory is initially output, to cause said output unit to output said certain image data again, said control unit operates in a first mode, before a predetermined time passes from output of said certain image data, to cause said output unit to output said certain image data again in response to reception of said re-output instruction, and said control unit operates in a second mode, after said predetermined time passes from output of said certain image data, to cause said output unit to output said certain image data again on condition that a password is entered in said input unit that is stored in said password store unit and corresponds to said certain image data.

2. The image data outputting apparatus according to claim 1, further comprising a password determination unit providing said password.

3. The image data outputting apparatus according to claim 1, wherein said password is set by an operator.

4. The image data outputting apparatus according to claim 1, further comprising a key for instructing that certain image data stored in said memory should be output again.

5. The image data outputting apparatus according to claim 4, wherein said key is a touch panel.

6. The image data outputting apparatus according to claim 1, further comprising a display unit displaying information, wherein when said control unit operates in said second mode, said control unit causes said display unit to display information to urge that said password should be entered.

7. An image data outputting apparatus comprising:

a memory storing image data;

an output unit outputting the image data stored in said memory;

a control unit controlling operation of said output unit;

a password store unit storing a password corresponding to the image data;

an input unit for entering information; and an operator detection unit detecting presence/absence of an operator, wherein when said control unit receives a re-output instruction, after a certain image data stored in said memory is initially output, to cause said output unit to output said certain image data again, said control unit operates in a first mode, when said operator detection unit keeps detecting presence of an operator after output of said certain image data, to cause said output unit to output said certain image data again in response to reception of said re-output instruction, and said control unit operates in a second mode, when said operator detection unit detects absence of an operator after output of said certain image data, to cause said output unit to output said certain image data again on condition that a password is entered in said input unit that is stored in said password store unit and corresponds to said certain image data.

8. The image data outputting apparatus according to claim 7, further comprising a password determination unit providing said password.

9. The image data outputting apparatus according to claim 7, wherein said password is set by an operator.

10. The image data outputting apparatus according to claim 7, further comprising a key for instructing that certain image data stored in said memory should be output again.

11. The image data outputting apparatus according to claim 10, wherein said key is a touch panel.

12. The image data outputting apparatus according to claim 7, further comprising a display unit displaying information, wherein when said control unit operates in said second mode, said control unit causes said display unit to display information to urge that said password should be entered.

13. A method of outputting image data stored in a memory, comprising the steps of:

when a re-output instruction is received, after a certain image data stored in said memory is initially output, to output said certain image data again, outputting said certain image data again, before a predetermined time passes from output of said certain image data, in response to reception of said re-output instruction; and outputting said certain image data again, after said predetermined time passes from output of said certain image data, on condition that a password corresponding to said certain image data is entered.

14. The method of outputting image data according to claim 13, wherein said password is provided by an apparatus outputting said image data.

15. The method of outputting image data according to claim 13, wherein said password is set by an operator.

16. A method of outputting image data stored in a memory, comprising the steps of:

when a re-output instruction is received, after a certain image data stored in said memory is initially output, to output said certain image data again, outputting said certain image data again in response to reception of said re-output instruction when presence of an operator is kept detected after output of said certain image data; and outputting said certain image data again on condition that a password corresponding to said certain image data is entered when absence of an operator is detected after output of said certain image data.

17. The method of outputting image data according to claim 16, wherein said password is provided by an apparatus outputting said image data.

18. The method of outputting image data according to claim 16, wherein said password is set by an operator.

* * * * *